United States Patent
Nakayama et al.

(10) Patent No.: US 12,458,238 B2
(45) Date of Patent: Nov. 4, 2025

(54) ISCHEMIC CARDIOPATHY DIAGNOSIS ASSISTANCE SYSTEM

(71) Applicant: WASEDA UNIVERSITY, Tokyo (JP)

(72) Inventors: Masafumi Nakayama, Tokyo (JP); Kiyotaka Iwasaki, Tokyo (JP)

(73) Assignee: WASEDA UNIVERSITY, Tokyo (JP)

( * ) Notice: Subject to any disclaimer, the term of this patent is extended or adjusted under 35 U.S.C. 154(b) by 737 days.

(21) Appl. No.: 17/259,988

(22) PCT Filed: Jul. 19, 2019

(86) PCT No.: PCT/JP2019/028565
§ 371 (c)(1),
(2) Date: Jan. 13, 2021

(87) PCT Pub. No.: WO2020/022232
PCT Pub. Date: Jan. 30, 2020

(65) Prior Publication Data
US 2021/0267467 A1    Sep. 2, 2021

(30) Foreign Application Priority Data

Jul. 26, 2018   (JP) ................. 2018-139860

(51) Int. Cl.
*A61B 5/021*    (2006.01)
*A61B 5/00*    (2006.01)
(Continued)

(52) U.S. Cl.
CPC ............ *A61B 5/0215* (2013.01); *A61B 5/026* (2013.01); *A61B 5/349* (2021.01); *A61B 5/72* (2013.01)

(58) Field of Classification Search
None
See application file for complete search history.

(56) References Cited

U.S. PATENT DOCUMENTS 6,256,538 B1 * 7/2001 Ekwall ............... A61N 1/36564
                                              607/17
2008/0234658 A1 * 9/2008 Kassab ..................... A61F 7/12
                                              604/96.01
(Continued)

OTHER PUBLICATIONS

International Search Report dated Sep. 17, 2019, issued in counterpart International Application No. PCT/JP2019/028565 (2 pages).

*Primary Examiner* — Aurelie H Tu
(74) *Attorney, Agent, or Firm* — WHDA, LLP

(57) ABSTRACT

An ischemic cardiopathy diagnosis assistance system includes pressure data acquisition means 11 for acquiring pressure data including proximal pressure Pa in a proximal stenotic segment A1 and distal pressure Pd in a distal stenotic segment A2; intracoronary electrocardiogram data acquisition means 12 for acquiring intracoronary electrocardiogram data made up of a local intracoronary artery electrocardiogram in a neighborhood of the distal stenotic segment; and computational processing means 14 for finding a pressure ratio Pa/Pd between the proximal pressure Pa and distal pressure Pd at a time suitable for diagnosis of ischemic cardiopathy based on these data. The computational processing means temporally associates the pressure data with the intracoronary electrocardiogram data, estimates an analysis period T during which vascular resistance remains stably low from a waveform of the intracoronary electrocardiogram data, and extract the pressure data of the analysis period T, and finds the pressure ratio Pa/Pd from the pressure data.

6 Claims, 5 Drawing Sheets

(51) Int. Cl.
*A61B 5/0215* (2006.01)
*A61B 5/026* (2006.01)
*A61B 5/349* (2021.01)

(56) References Cited

U.S. PATENT DOCUMENTS

| | | | |
|---|---|---|---|
| 2009/0209950 A1* | 8/2009 | Starksen | A61B 17/0401 |
| | | | 606/41 |
| 2013/0046190 A1 | 2/2013 | Davies | |
| 2013/0090555 A1* | 4/2013 | Kassab | A61B 5/0215 |
| | | | 600/468 |
| 2014/0142398 A1* | 5/2014 | Patil | A61B 5/0538 |
| | | | 600/301 |
| 2014/0257070 A1* | 9/2014 | Blomqvist | A61B 5/287 |
| | | | 600/374 |
| 2014/0276140 A1 | 9/2014 | Kinghorn | |
| 2015/0112152 A1 | 4/2015 | Ryan et al. | |
| 2015/0324962 A1 | 11/2015 | Itu et al. | |
| 2016/0135757 A1* | 5/2016 | Anderson | A61B 5/7475 |
| | | | 600/407 |
| 2016/0157785 A1 | 6/2016 | Merritt et al. | |
| 2016/0220131 A1* | 8/2016 | Kishida | A61B 5/7278 |
| 2017/0189654 A1 | 7/2017 | Schwartz et al. | |
| 2017/0332918 A1* | 11/2017 | Keane | A61B 5/7257 |

* cited by examiner

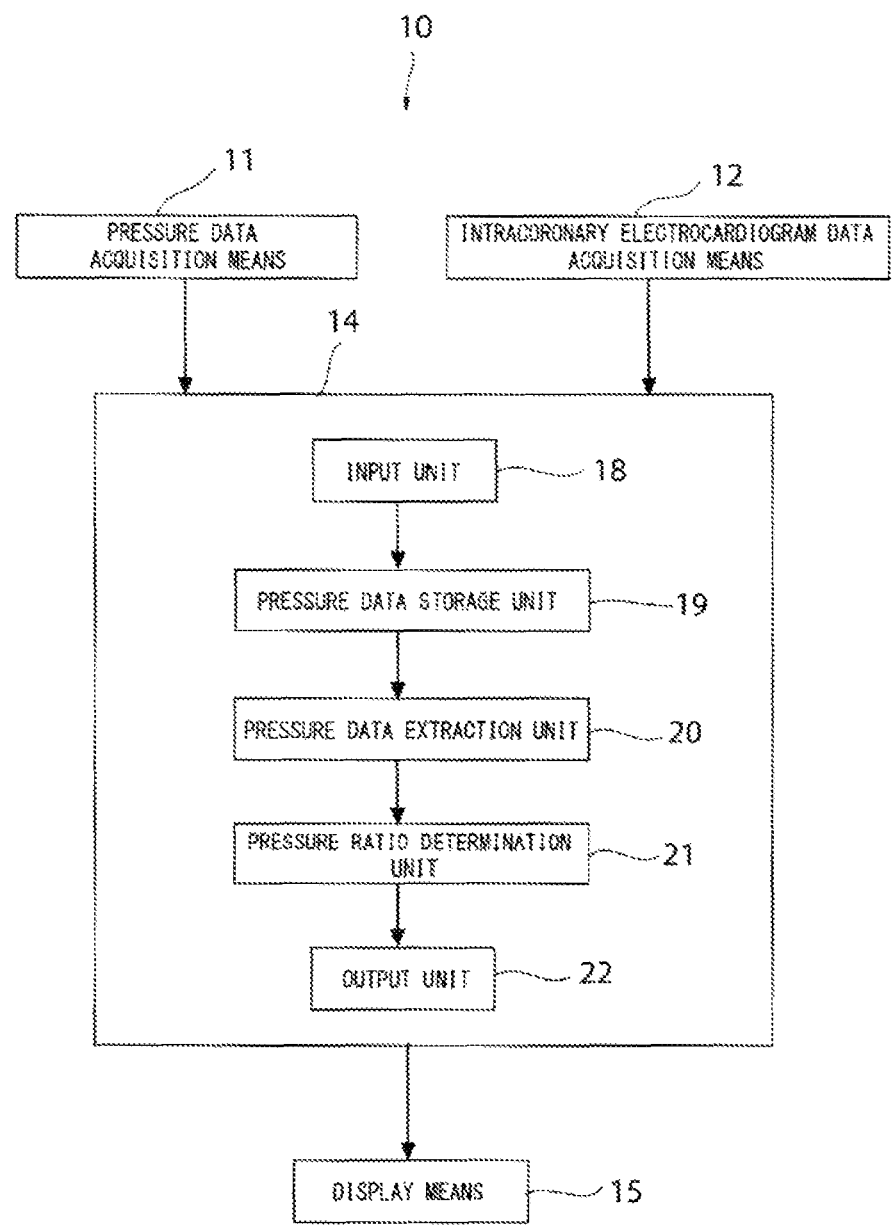

FIG. 3(A)
FIG. 3(B) POTENTIAL
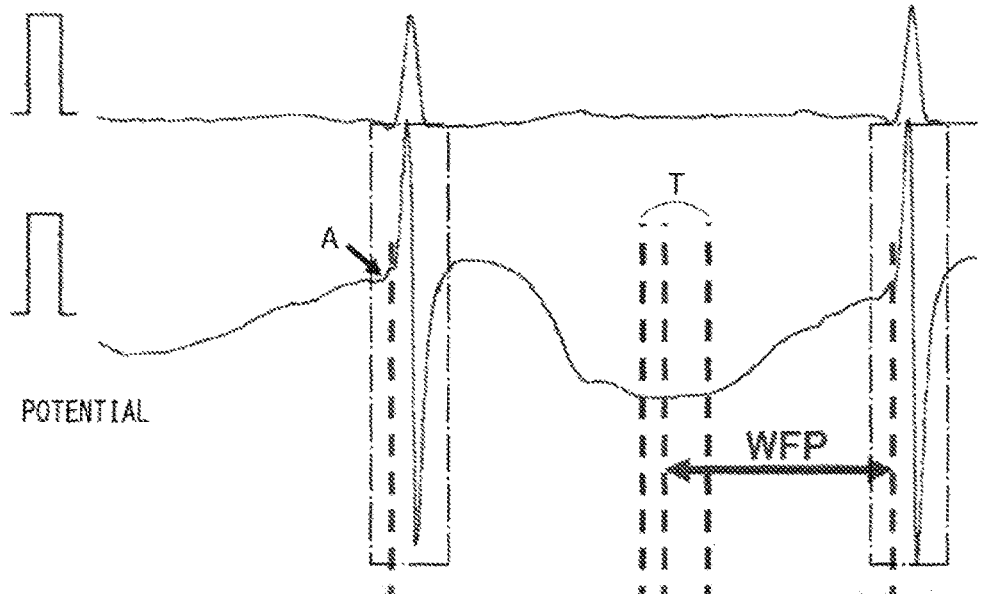
FIG. 3(C) PRESSURE (mmHg)
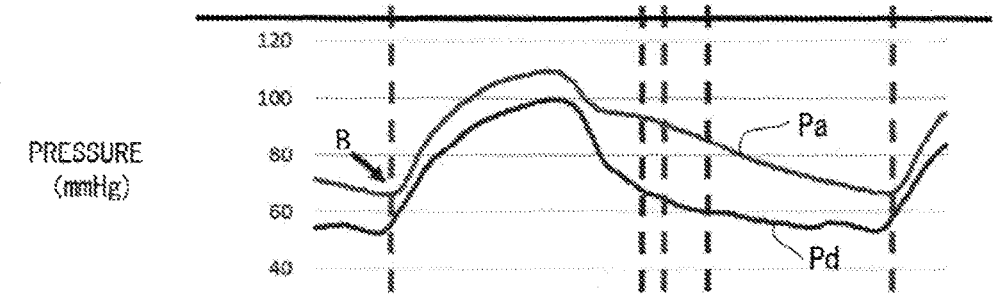
FIG. 3(D) PRESSURE RATIO Pd/Pa
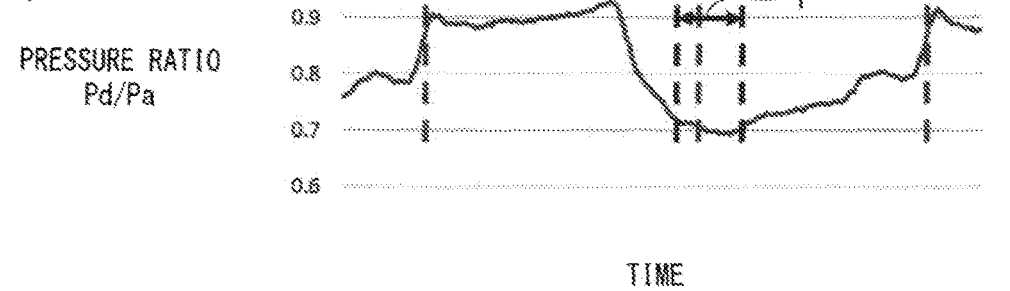
TIME F I G . 5
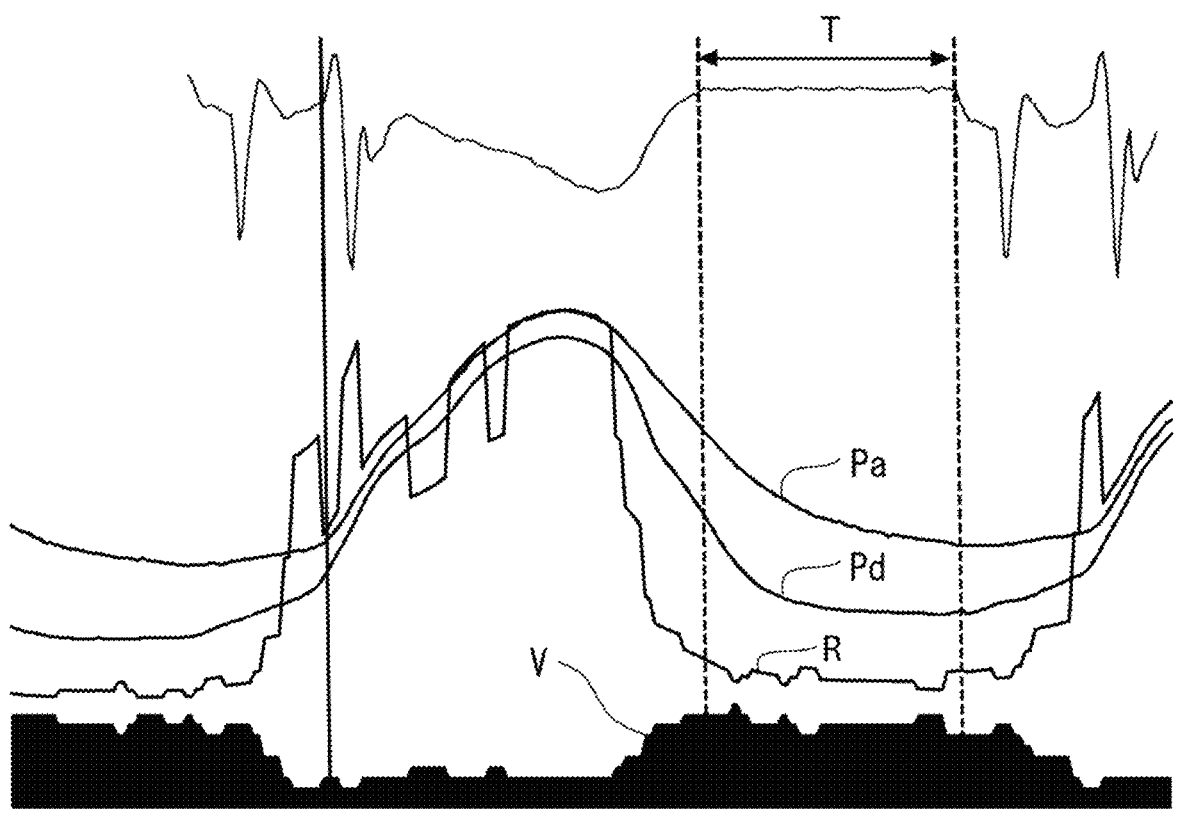

ISCHEMIC CARDIOPATHY DIAGNOSIS ASSISTANCE SYSTEM

TECHNICAL FIELD

The present invention relates to a diagnosis assistance system that measures intracoronary pressures in a proximal stenotic segment and distal stenotic segment in a coronary artery of a patient and finds a pressure ratio between the proximal stenotic segment and distal stenotic segment as a diagnosis index of ischemic cardiopathy, and more particularly, to a diagnosis assistance system that becomes useful in diagnosing ischemic cardiopathy, by finding the pressure ratio at a time when intravascular resistance value has a reduced impact.

BACKGROUND ART

For appropriate treatment decisions on ischemic cardiopathy such as cardiac angina, it is important to evaluate whether myocardial ischemia exists, whereby intracoronary blood flow becomes inadequate. Treatment such as stent placement in a lesioned blood vessel without myocardial ischemia is not only meritless, but also likely to lead to a poor prognosis due to in-stent restenosis, increased hemorrhagic events resulting from internal use of an antiplatelet agent, or the like.

Thus, as ischemia diagnosis that can be conducted during cardiac catheterization, a method is known that makes a decision by calculating a diagnosis index known as fractional flow reserve (FFR) or instantaneous wave-free ratio (iFR) using a coronary insertion guide wire equipped with a pressure sensor and known as a pressure wire (see, for example, Patent Literatures 1 and 2).

The FFR described above, which is an index found with the microvascular resistance of the patient reduced by medication, is defined as a pressure ratio Pd/Pa between pressure in a proximal stenotic segment upstream of a stenotic lesion in a coronary artery (proximal pressure) Pa and pressure in a distal stenotic segment on the downstream side (distal pressure) Pd. When the FFR is lower than 0.80 or 0.75, it is determined that the patient has myocardial ischemia, which presents a rule of thumb for administering coronary stenting or other treatment.

On the other hand, the iFR described above is an average value of all pressure ratios Pd/Pa measured without administering a medicine to the patient, during the mesodiastolic to telediastolic period (WFP: Wave free period) in which the intravascular resistance value at rest is considered to be generally low, and it is determined that the patient has myocardial ischemia, for example, when the iFR is lower than 0.89.

CITATION LIST

Patent Literature

Patent Literature 1: Japanese Patent Laid-Open No. 2018-89364
Patent Literature 2: National Publication of International Patent Application No. 2018-500982

SUMMARY OF INVENTION

Technical Problem

A diagnostic technique that uses the FFR as an index finds the pressure ratio Pd/Pa in a fully congested state in which resistance vessels are expanded to the maximum, making vascular resistance uniform, in the entire cardiac cycle by administering a medicine such as adenosine or papaverine hydrochloride to a subject to reduce microvascular resistance. However, adenosine, which could induce asthma, is difficult to use for patients with a medical history of asthma. Besides, the effect of the medicine may be reduced for some patients after intake of caffeine and the like, making it necessary to check whether a fully congested state has been achieved. Furthermore, papaverine hydrochloride involves the risk of causing fatal arrhythmia, and is not in use in Europe and North America. Thus, recently, in addition to diagnosis by the use of angiograms, there is a need to derive the pressure ratio Pd/Pa for use in making appropriate treatment decisions on stent placement and the like without administering a medicine as described above.

On the other hand, the diagnostic technique that uses the iFR as an index is free of the need to administer a medicine to the patient in advance unlike the FFR described above, and is thus free of the problem arising from administration of the medicine. However, studies conducted by the present inventors have found that with iFR, the intravascular resistance value may not fall sufficiently even during the WFP depending on the patient and that an appropriate diagnosis of ischemic cardiopathy may not be reached.

Resistance values of the coronary arteries running on surfaces of cardiac muscles are also affected by myocardial motion, and the period in which the myocardial motion is the least active of the cardiac cycle is the slow filling phase. The slow filling phase is a period in which blood flows into the ventricles relatively slowly after the rapid filling phase in which blood flows rapidly into the ventricles right after the tricuspid valve and mitral valve open. When the heart rate increases, the cardiac diastolic phase including the filling phases is shortened, and in so doing, the slow filling phase is shortened more greatly than the rapid filling phase to maintain the stroke volume of the ventricles, and consequently individual differences occur in the length of the slow filling phase in which the resistance values of the coronary arteries are reduced.

Because no medication is used in finding iFR, it becomes important how to extract a range in which the intravascular resistance is low. However, the diagnostic technique that uses iFR estimates the intracoronary resistance values using a uniform algorithm regardless of the individuality of patients using only a pressure waveform at a proximal site serving as an inlet to a coronary artery and the R wave in electrocardiographic information of a body surface monitor, and the intracoronary resistance values may not fall sufficiently even during the WFP depending on the patient. Therefore, the intracoronary resistance value may not become constant even in a WFP time slot, in which case variations among the pressure ratios Pd/Pa corresponding to the values of resistance become relatively large. Thus, the diagnostic technique that uses iFR is not capable of finding a pressure ratio Pd/Pa with the resistance value of the coronary artery kept uniformly low, and may not reach an appropriate diagnosis of ischemic cardiopathy.

An object of the present invention, which has been made based on the above findings made by the inventors, is to provide an ischemic cardiopathy diagnosis assistance system that can estimate the time when the resistance values of the coronary arteries of respective patients become uniformly low and can find the pressure ratio between the proximal stenotic segment and distal stenotic segment of the coronary artery at this time.

Solution to Problem

To achieve the above object, the present invention provides an assistance system that measures intracoronary pressure in a proximal stenotic segment upstream of a stenotic lesion site in a coronary artery of a patient and intracoronary pressure in a distal stenotic segment on a downstream side and finds a pressure ratio between the proximal stenotic segment and distal stenotic segment mainly as a diagnosis index of ischemic cardiopathy, the assistance system comprising: pressure data acquisition means for acquiring pressure data including proximal pressure, which is pressure in the proximal stenotic segment, and distal pressure, which is pressure in the distal stenotic segment; intracoronary electrocardiogram data acquisition means for acquiring intracoronary electrocardiogram data made up of a local intracoronary artery electrocardiogram in a neighborhood of the distal stenotic segment; and computational processing means for finding the pressure ratio at a time suitable for diagnosis of ischemic cardiopathy based on the data acquired by the pressure data acquisition means and the data acquired by the intracoronary electrocardiogram data acquisition means, wherein the computational processing means includes a pressure data extraction unit configured to temporally associate the pressure data with the intracoronary electrocardiogram data, estimates an analysis period during which vascular resistance remains stably low from a waveform of the intracoronary electrocardiogram data, and extract the pressure data of the analysis period, and a pressure ratio determination unit configured to find the pressure ratio from the pressure data extracted by the pressure data extraction unit.

Advantageous Effects of Invention

Using the local intracoronary electrocardiogram data in the coronary artery, the present invention can find the pressure ratio between the proximal stenotic segment and distal stenotic segment at the time when a state of myocardial motion becomes the lowest while monitoring the state of myocardial motion. That is, assuming that in the intracoronary electrocardiogram data, a time slot in which a low electric potential continues is a period in which the influence of an intracoronary vascular resistance value is minimized, the pressure ratio can be measured in a time period during which the vascular resistance remains stably low based on the state of the waveform of the intracoronary electrocardiogram data of each patient. This makes it possible to calculate the pressure ratio that allows ischemic cardiopathy to be diagnosed more accurately regardless of whether the patient is at rest or under medication, and it is expected that the present system will be more useful in conducting an appropriate diagnosis of ischemic cardiopathy than a conventional pressure ratio calculation technique that uses no intracoronary electrocardiogram data.

BRIEF DESCRIPTION OF DRAWINGS

FIG. 2 is a block diagram schematically showing a configuration of the diagnosis assistance system.

FIG. 3(A) is a surface electrocardiogram showing a changing state of a cardiac potential versus time, the cardiac potential being measured on a body surface, FIG. 3(B) is an intracoronary electrocardiogram showing a changing state of a local potential versus time, the local potential being measured in a coronary artery A, FIG. 3(C) is a graphic chart showing pressure waveforms versus time, the pressure waveforms representing changing states of proximal pressure Pa and distal pressure Pd, and FIG. 3(D) is a graphic chart showing a waveform versus time, the waveform representing a changing state of a pressure ratio Pd/Pa.

FIG. 5 is a graphic chart superimposing and showing time variations of an intracoronary electrocardiogram, proximal pressure Pa, distal pressure Pd, coronary blood flow, and intravascular resistance value, which are used for processing in the other embodiment.

DESCRIPTION OF EMBODIMENTS

Embodiments of the present invention will be described below with reference to the drawings.

Figure 1:
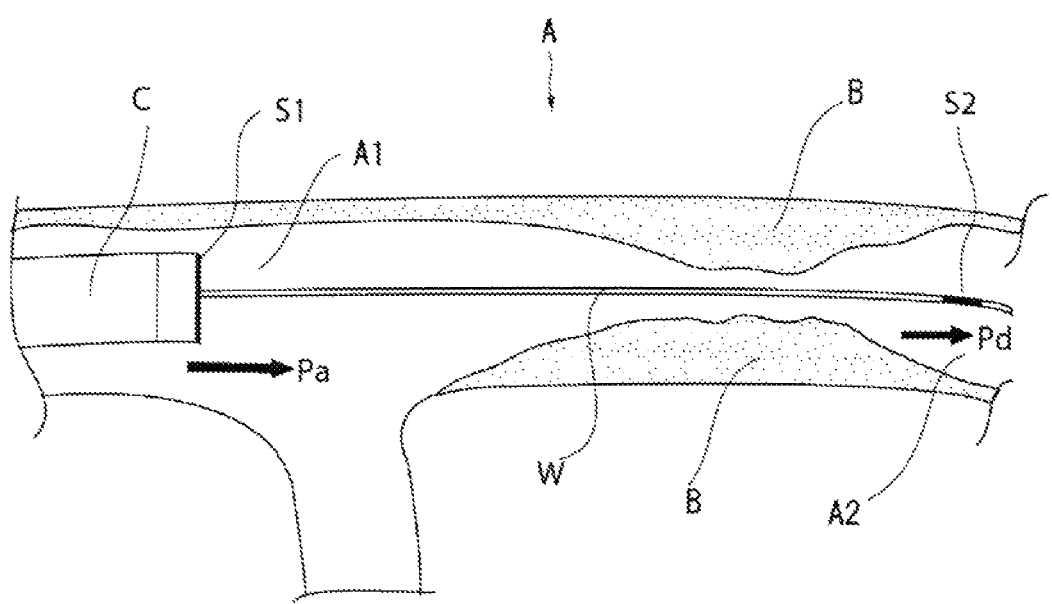
FIG. 1 is a conceptual diagram for explaining pressure measurement sites for a diagnosis assistance system according to the present embodiment.

FIG. 1 shows a conceptual diagram for explaining pressure measurement sites in an ischemic cardiopathy diagnosis assistance system according to the present embodiment and FIG. 2 shows a block diagram schematically illustrating a configuration of the diagnosis assistance system.

The diagnosis assistance system 10 finds a pressure ratio between intravascular pressures (intracoronary pressures) at two sites as a diagnosis index of ischemic cardiopathy, where the two sites are located on opposite sides of a stenotic lesion site B in a coronary artery A of a patient shown in FIG. 1. That is, the diagnosis assistance system 10 finds a pressure ratio Pd/Pa, which is a ratio of distal pressure Pd to proximal pressure Pa, from measurement results of the distal pressure Pd and proximal pressure Pa, where the proximal pressure Pa is a pressure in a proximal stenotic segment A1 upstream of the stenotic lesion site B, i.e., a pressure corresponding to aortic pressure, while the distal pressure Pd is a pressure in a distal stenotic segment A2 downstream of the stenotic lesion site B. The pressure ratio Pd/Pa is found based on an intracoronary electrocardiogram (icECG) of the patient at a time suitable for diagnosis.

Specifically, as shown in FIG. 2, the diagnosis assistance system 10 includes pressure data acquisition means 11 for acquiring pressure data made up of proximal pressure Pa and distal pressure Pd, intracoronary electrocardiogram data acquisition means 12 for acquiring intracoronary electrocardiogram data made up of a local icECG in the neighborhood of the distal stenotic segment A2, computational processing means 14 made up of a computer configured to find the pressure ratio Pd/Pa using arithmetic operations at a time suitable for diagnosis of ischemic cardiopathy based on the data acquired by the pressure data acquisition means 11 and the data acquired by the intracoronary electrocardiogram data acquisition means 12, and display means 15 made up of a display device or other display configured to display diagnosis information including the pressure ratio Pd/Pa found by the computational processing means 14.

A known cardiac catheter testing device, which is pressure data acquisition device capable of measuring the proximal pressure Pa and distal pressure Pd, is used as the pressure data acquisition means 11. That is, a device having a known structure is adopted as the pressure data acquisition means 11, provided that as shown in FIG. 1, the device can detect the proximal pressure Pa using a detection unit si provided on a catheter C whose distal side is located in the proximal stenotic segment A1 and detect the distal pressure Pd using a guide wire W (pressure wire) made of metal and equipped with a pressure sensor S2 extending to the distal stenotic segment A2 from inside a lumen of the catheter C. Note that after the guide wire W is aligned with the distal side of the catheter C, default is done to match the time phase between the proximal pressure Pa and distal pressure Pd.

Also, the pressure data acquisition means 11 according to the present invention is not limited to the configuration example described above, and may be any other device or system capable of measuring the proximal pressure Pa and distal pressure Pd.

An intracoronary electrocardiogram data acquisition device or intracoronary electrocardiogram data acquisition system capable of measuring icECG, which is a local electrocardiogram in the coronary artery A in the neighborhood of the distal stenotic segment A2 is used as the intracoronary electrocardiogram data acquisition means 12. Such a device or system is configured to be able to measure icECG in the coronary artery A around the pressure sensor S2 in a unipolar lead mode, with the guide wire W connected to a measuring instrument via a non-illustrated lead wire, for example, using the distal side of the guide wire W as an electrode.

Note that any of devices and systems of various structures can be adopted as the intracoronary electrocardiogram data acquisition means 12 as long as a local electrocardiogram in the coronary artery A can be measured.

As shown in FIG. 2, the computational processing means 14 includes an input unit 18 configured to accept, as input, pressure data of the proximal pressure Pa and distal pressure Pd received from the pressure data acquisition means 11 and intracoronary electrocardiogram data acquired by the intracoronary electrocardiogram data acquisition means 12, a pressure data storage unit 19 configured to store each item of the pressure data at predetermined time intervals (e.g., 5 ms), a pressure data extraction unit 20 configured to temporally associate the intracoronary electrocardiogram data with time-series pressure data stored by the pressure data storage unit 19 and extract pressure data in a time slot appropriate for diagnosis from an icECG waveform, a pressure ratio determination unit 21 configured to find the pressure ratio Pd/Pa using the pressure data extracted by the pressure data extraction unit 20, and an output unit 22 configured to output diagnosis information including the pressure ratio Pd/Pa determined by the pressure ratio determination unit 21 to the display means 15.

The input unit 18, which is designed to receive electrical signals transmitted from the pressure data acquisition means 11 and intracoronary electrocardiogram data acquisition means 12, captures pressure data and intracoronary electrocardiogram data in succession.

The pressure data extraction unit 20 includes a function to synchronize the pressure data and intracoronary electrocardiogram data with each other, identifies a time slot in which vascular resistance remains stably low as an analysis period, and extracts the proximal pressure Pa and distal pressure Pd in the analysis period as pressure data. Here, the analysis period is a time slot in which a low electric potential continues over an entire icECG and the potential change is flat and stable.

Processes of the pressure data extraction unit 20 will be described below using data in FIGS. 3(A) to 3(D) as an example. FIG. 3(A) is a surface electrocardiogram showing a changing state of a cardiac potential versus time, the cardiac potential being measured on a body surface and FIG. 3(B) is icECG showing a changing state of a local potential versus time, the local potential being measured in the coronary artery A. Also, FIG. 3(C) is a graphic chart showing pressure waveforms versus time, the pressure waveforms representing changing states of proximal pressure Pa and distal pressure Pd, and FIG. 3(D) is a graphic chart showing a waveform versus time, the waveform representing a changing state of a pressure ratio Pd/Pa.

First, regarding the pressure data and intracoronary electrocardiogram data, the start time (arrow A) of a QRS wave that represents a ventricular contraction on the icECG waveform in FIG. 3(B) and the start time (arrow B) of a systole on the pressure waveform in FIG. 3(C) are synchronized based on waveform information stored in advance. Note that in achieving the synchronization, a correction is made by taking into consideration a time lag from when ventricular excitation is measured based on icECG to when the ventricular excitation appears in a change in aortic pressure.

Also, for example, regarding the sinus rhythm, as shown in FIG. 3(B), an analysis period T is identified by selecting from a time interval starting from the Q wave, passing through the T wave or U wave, and ending at the wave on which the electric potential starts to rise the next time such as the P wave or Q wave. The analysis period T is not particularly limited, but a target zone excluding zones containing a maximum potential and a minimum potential (frames indicated by dashed lines in FIG. 3(B)) is extracted from the intracoronary electrocardiogram data, a zone in which a potential change remains within a predetermined range from a lowest potential is identified, the zone centering around a time point at which the lowest potential occurs, the predetermined range being smaller than a predetermined value or a predetermined ratio, and this zone is determined as the analysis period T. Note that a time slot in which the icECG potential is low, flat, and stable can also be extracted by any of various other computation and analysis processes such as icECG image processing, according to the icECG waveform.

Also, considering the possibility that the intracoronary pressure will be affected before and after the zone identified above, by cutting off opposite ends of the zone or a predetermined time interval (e.g., 25 ms to 50 ms) before or after the zone, a time slot corresponding to remaining part of the zone may be designated as the analysis period T. Furthermore, the duration of the minimum potential in the target zone may be designated as the analysis period T.

Using the pressure data acquired in the analysis period T, the pressure ratio determination unit 21 calculates the pressure ratios Pd/Pa at individual time points from the proximal pressure Pa and distal pressure Pd detected at same times and calculates an average value of the pressure ratios Pd/Pa. The average pressure ratio Pd/Pa is presented as a diagnosis index of ischemic cardiopathy to physicians and the like from the output unit 22 via the display means 15.

Note that the pressure ratio Pd/Pa as a diagnosis index is not limited to the average value described above, and may be a maximum value and/or minimum value or may be calculated from pressure data in the analysis period T using a predetermined mathematical expression.

Study results produced by the present inventors have demonstrated that with the individual differences among patients taken into consideration, the diagnosis assistance system 10 can derive the pressure ratio Pd/Pa in a time slot in which the intracoronary resistance value is considered to become lower than with the conventional diagnostic technique that uses iFR. That is, the conventional technique that uses iFR, extracts a time slot in which the pressure decreases almost monotonously as a WEP that corresponds to a time slot that ranges from the mid-diastolic to end-diastolic, in which the intravascular resistance value is considered to be generally low, from the pressure waveform in FIG. 3(C) and designates the average value of the pressure ratios Pd/Pa at individual time points in the WEP as an iFR value. However, as shown in FIG. 3(C), even in the range of WFP, a pressure difference (pressure gradient) between the proximal pressure Pa and distal pressure Pd varies, increasing a height difference in the pressure ratio Pd/Pa as shown in FIG. 3(D). In this respect, the diagnosis assistance system 10 according to the present embodiment estimates a time slot in which intracoronary resistance is low, with the state of myocardial motion taken into consideration, based on intracoronary electrocardiogram data of FIG. 3(B), which is never used conventionally in finding the pressure ratio Pd/Pa. This decreases the variation in the pressure difference between the proximal pressure Pa and distal pressure Pd, making it possible to reduce the height difference in the pressure ratio Pd/Pa more greatly than the conventional technique. This in turn makes it possible to derive the pressure ratio Pd/Pa serving as a diagnosis index in a time slot in which the intracoronary resistance value is at a lower level and it is expected that the diagnosis assistance system 10 will be more useful to acquire a diagnosis index in appropriately determining reduction in coronary blood flow due to a stenotic lesion based on pressure data.

Next, another embodiment of the present invention will be described. Note that in the following description, components identical or equivalent to those of the above embodiment are denoted by the same reference numerals as the corresponding components, and description thereof will be omitted or simplified.

Figure 4:
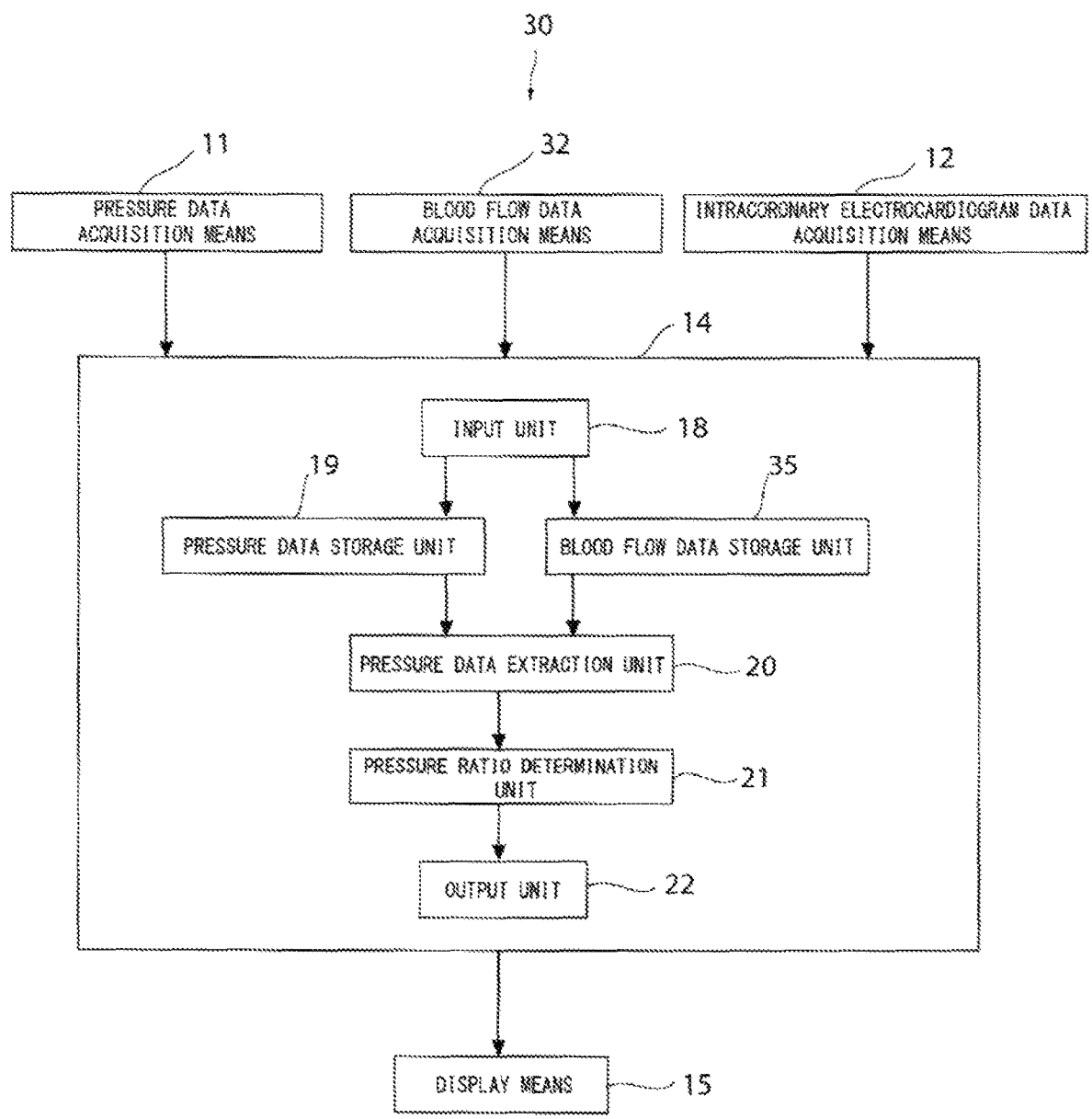
FIG. 4 is a block diagram schematically showing a configuration of a diagnosis assistance system according to another embodiment.

Compared to the above embodiment as shown in FIG. 4, a diagnosis assistance system 30 according to the present embodiment further includes blood flow data acquisition means 32 capable of measuring coronary blood flow in the distal stenotic segment A2 such that the computational processing means 14 can derive the pressure ratio Pd/Pa using measurement results of the blood flow as well.

As the blood flow data acquisition means 32, a blood flow data acquisition device having a known structure is adopted, the device including a sensor capable of detecting blood flow by measuring a blood flow rate at a site on a distal side of a wire extending to the distal stenotic segment A2. The blood flow data acquisition means 32 may be, for example, a device integrated with the pressure data acquisition means 11 or any other device as long as the device can detect blood flow data, which is data on blood flow including the blood flow rate.

The computational processing means 14 according to the present embodiment is designed to find the pressure ratio Pd/Pa at a time suitable for diagnosis of ischemic cardiopathy using the blood flow data acquired by the blood flow data acquisition means 32 in addition to the data acquired by the pressure data acquisition means 11 and the data acquired by the intracoronary electrocardiogram data acquisition means 12.

That is, here, the computational processing means 14 further includes a blood flow data storage unit 35 configured to store blood flow data every predetermined time when the blood flow data acquired by the blood flow data acquisition means 32 is further inputted to the input unit 18.

Also, the pressure data extraction unit 20 here causes the pressure data and intracoronary electrocardiogram data temporally associated with each other as described above to be temporally associated further with blood flow data V (black area in FIG. 5) corresponding to time-series blood flow stored in the blood flow data storage unit 35, for example, as shown in FIG. 5. Then, by further taking the blood flow data V into consideration, the pressure data extraction unit 20 extracts the proximal pressure Pa and distal pressure Pd in the analysis period T as pressure data at individual time points in the analysis period T derived as described above. Specifically, for example, by comparing values of the blood flow data V at individual time points in preceding and following time slots or using a preset threshold, the pressure data extraction unit 20 extracts the proximal pressure Pa and distal pressure Pd at such time points in the analysis period T at which the volume of blood flow is relatively large among the blood flow data V, and then the pressure ratio determination unit 21 calculates the pressure ratio Pd/Pa at each time point. Also, it is possible to further find intravascular resistance value R by dividing the distal pressure Pd by the blood flow and extract the proximal pressure Pa and distal pressure Pd from the analysis period T according to the magnitude of the intravascular resistance value R. For example, it is possible to extract the proximal pressure Pa and distal pressure Pd at time points when the intravascular resistance value R falls below a predetermined threshold and calculate the pressure ratios Pd/Pa.

Also, it has been demonstrated that compared to the conventional technique that uses iFR, the diagnosis assistance systems 10 and 30 provide effects similar to those described above even when used for an atrial fibrillation patient having an irregular cardiac potential.

Note that the diagnosis assistance systems 10 and 30 can be used not only when the patient is at rest under no medication, but also in finding the pressure ratio Pd/Pa by jointly using a medicine that induces a fully congested state as with conventional FFR derivation, and it has been demonstrated that the pressure ratio Pd/Pa can be derived with the intravascular resistance being kept stably low not only at rest, but also under medication.

Besides, configurations of various equipment items in the present invention are not limited to the illustrated configuration examples, and various changes can be made as long as substantially similar effects can be achieved.

REFERENCE SIGNS LIST 10, 30 Diagnosis assistance system
11 Pressure data acquisition means
12 Intracoronary electrocardiogram data acquisition means
14 Computational processing means
20 Pressure data extraction unit
21 Pressure ratio determination unit
32 Blood flow data acquisition means
A Coronary artery
A1 Proximal stenotic segment
A2 Distal stenotic segment
B Stenotic lesion site
Pa Proximal pressure
Pd Distal pressure
T Analysis period
V Blood flow data
R Intravascular resistance value

The invention claimed is:
1. An ischemic cardiopathy diagnosis assistance system that measures intracoronary pressure in a proximal stenotic segment on an upstream side of a stenotic lesion site in a coronary artery of a patient and intracoronary pressure in a distal stenotic segment on a downstream side of the stenotic lesion site in the coronary artery of a patient and finds a pressure ratio between the proximal stenotic segment and the distal stenotic segment as a diagnosis index of ischemic cardiopathy, the assistance system comprising:

pressure data acquisition means for acquiring pressure data including proximal pressure, which is pressure in the proximal stenotic segment, and distal pressure, which is pressure in the distal stenotic segment;

intracoronary electrocardiogram data acquisition means for acquiring intracoronary electrocardiogram data made up of a local intracoronary artery electrocardiogram in a neighborhood of the distal stenotic segment; and computational processing means for finding the pressure ratio at a time for diagnosis of ischemic cardiopathy based on the data acquired by the pressure data acquisition means and the data acquired by the intracoronary electrocardiogram data acquisition means, wherein the pressure data acquisition means is a pressure apparatus including a first pressure sensor and a second pressure sensor, the first pressure sensor is configured to be placed in the proximal stenotic segment for acquiring the proximal pressure, the pressure apparatus includes a guide wire coupled with the second pressure sensor, and the second pressure sensor is configured to be placed in the distal stenotic segment for acquiring the distal pressure;

the intracoronary electrocardiogram data acquisition means is an intracoronary electrocardiogram data acquisition device including an electrode, a distal side of the guide wire is the electrode configured to be placed in the distal stenotic segment in a unipolar lead mode for acquiring the local intracoronary artery electrocardiogram; and the computational processing means includes:
    a pressure data extraction unit configured to temporally associate the pressure data with the intracoronary electrocardiogram data, wherein the intracoronary electrocardiogram data and the pressure data including the proximal pressure and the distal pressure are acquired during a same time period in the coronary artery, estimate an analysis period from a waveform of the intracoronary electrocardiogram data, and extract the pressure data of the analysis period, and
    a pressure ratio determination unit configured to find the pressure ratio from the pressure data extracted by the pressure data extraction unit.

2. The ischemic cardiopathy diagnosis assistance system according to claim 1, wherein the pressure data extraction unit identifies a zone in which a shape of a waveform of an intracoronary artery electrocardiogram reveals a limited temporal potential change and designates a time slot in the zone as the analysis period.

3. The ischemic cardiopathy diagnosis assistance system according to claim 1, wherein the pressure data extraction unit extracts a target zone excluding zones containing a maximum potential and a minimum potential from the intracoronary electrocardiogram data, and within the target zone, identifies a zone in which a potential change remains within a predetermined range from a lowest potential, the zone centering around a time point at which the lowest potential occurs, a span of the predetermined range being less than a predetermined value, and determines a time slot in the zone as the analysis period.

4. The ischemic cardiopathy diagnosis assistance system according to claim 1, wherein the pressure data extraction unit extracts a target zone excluding zones containing a maximum potential and a minimum potential from the intracoronary electrocardiogram data, and within the target zone, identifies a zone in which a potential change remains within a predetermined range from a lowest potential, the zone centering around a time point at which the lowest potential occurs, a span of the predetermined range being less than a predetermined value, cuts off opposite ends of the zone or a predetermined time interval before or after the zone, and determines a resulting time slot as the analysis period.

5. The ischemic cardiopathy diagnosis assistance system according to claim 1, further comprising blood flow data acquisition means configured to be able to measure blood flow data corresponding to blood flow in the distal stenotic segment, wherein
    the pressure data extraction unit extracts the pressure data according to magnitude of the blood flow.

6. The ischemic cardiopathy diagnosis assistance system according to claim 1, further comprising blood flow data acquisition means configured to be able to measure blood flow data corresponding to blood flow in the distal stenotic segment, wherein
    the pressure data extraction unit calculates intravascular resistance value from the blood flow data and the distal pressure and extracts the pressure data according to magnitude of the intravascular resistance value.

* * * * *